Figure 1:
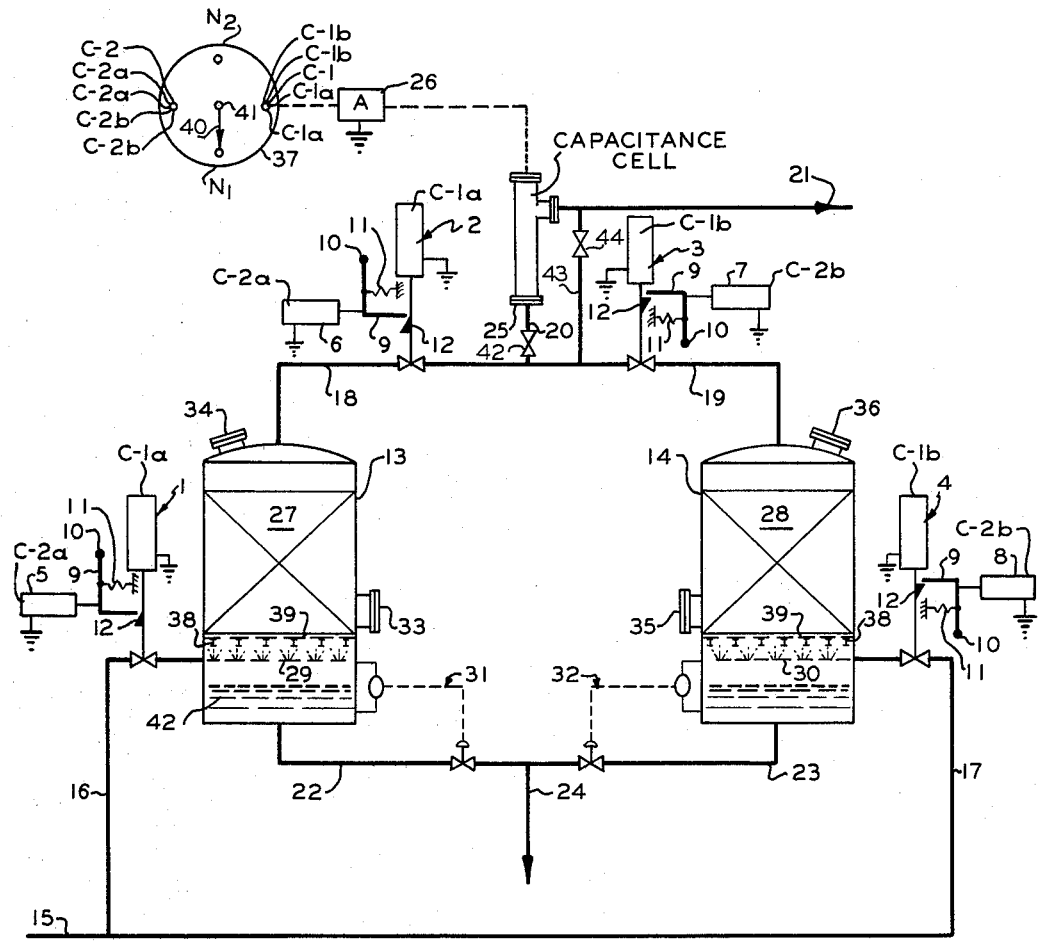

Nov. 2, 1965   J. M. BROOKE   3,215,619
PROCESS FOR REMOVAL OF ENTRAINED MOISTURE FROM HYDROCARBONS
Filed Jan. 29, 1962

INVENTOR.
J. M. BROOKE
BY *Young & Quigg*
ATTORNEYS

United States Patent Office 3,215,619
Patented Nov. 2, 1965

3,215,619
PROCESS FOR REMOVAL OF ENTRAINED
MOISTURE FROM HYDROCARBONS
Jesse M. Brooke, Sweeny, Tex., assignor to Phillips
Petroleum Company, a corporation of Delaware
Filed Jan. 29, 1962, Ser. No. 169,351
7 Claims. (Cl. 208—188)

This invention relates to a method for dehydrating moisture-containing fluids. In one aspect it relates to a method for reducing the moisture content of hydrocarbon fluids containing moisture. In another aspect it relates to a method for coalescing suspended moisture and removing same from hydrocarbon liquids containing suspended moisture.

Prior art methods for removing suspended water droplets from liquid hydrocarbons involves filtering through sand towers, filtering through salt towers, that is, vessels containing a bed of sand or rock salt, and filtering through towers containing such packing material as solid caustic soda or the like.

It has been found that towers filled with sand are not as successful for removing suspended moisture as they might be. Only relatively small volumes of liquid hydrocarbon containing suspended moisture can be filtered through sand towers before some suspended moisture or cloudiness appears in the filtered liquid. Salt towers are relatively efficient for removing suspended moisture from liquid hydrocarbons; but as the moisture is condensed or coalesced on the surface of the salt grains, salt dissolves in the water with the result that the bed of salt ultimately is consumed in the form of brine. The brine must be disposed of, the disposal of which sometime presents problems difficult to solve.

I have found that by mixing an alkali metal carboxymethyl cellulose with sand or with other gritty, insoluble material that suspended moisture can be very efficiently removed from fluid hydrocarbons. The operation is particularly adapted to the removal of suspended moisture from liquid hydrocarbons. The process is operable for the removal of moisture from hyrocarbon gases as well as from liquid hydrocarbons. The term oil as used throughout this specification and claims is herein defined as being a hydrocarbon liquid or liquefied hydrocarbon material found in petroleum refineries or in gasoline extraction plants. The term also includes halogenated hydrocarbons, benzene, gases, such as hydrocarbon gases, the latter including methane, ethane, ethylene, propane, propylene, butane, butylene, and the like. Liquefied gases, such as liquid ethane, liquid ethylene, liquid propane, liquid propylene, liquid butane, and liquid butylene, are included broadly within the term. Such materials as carbon tetrachloride and the higher alcohols in which water is only slightly soluble are also included within the broad scope of the term oil.

An object of this invention is to provide a method for dehydrating moisture-containing fluids. Another object of this invention is to provide a method for reducing the moisture content of hydrocarbon fluids containing suspended and/or dissolved moisture. Still another object of this invention is to provide a method for coalescing suspended moisture droplets from hydrocarbon liquids and removing the coalesced moisture as water from the hydrocarbons. Other objects and advantages of this invention will be realized upon reading the following description which, taken with the attached drawing, forms a part of this specification.

Figure 2:
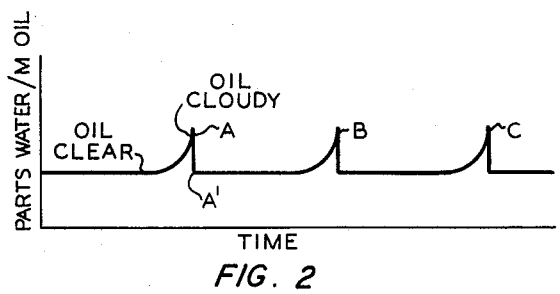

In the drawing, FIGURE 1 is a schematic representation of apparatus suitable for carrying out the process of this invention. FIGURE 2 is a plot illustrating the moisture content of treated fluids according to this invention.

In the drawing, I have illustrated a two-tank dehydration system. While this two-tank dehydration system is described, it will be obvious that more than two tanks can be employed in the same general manner as the two-tank system, and also a single-tank system can be used. However, when a single tank is used according to the invention the operation will need to be closed down at extended intervals for recharging the tank.

The tanks, as illustrated in FIGURE 1, are identified by reference numerals 13 and 14. These tanks are provided with spaced bars 38 extending across the entire cross-section of the tanks and at a spaced distance from the bottoms thereof. Positioned on top of these bars is a screen of such mesh as will retain the particle form and cellulosic material and yet permit easy flow of liquid being treated. Also the screen openings should be of such size and the screen of such pore space as to permit easy downflow of coalesced water while liquid being treated flows upward therethrough. A charge material, 27 in vessel 13 and 28 in vessel 14, is largely sand or other suitable grit material such as No. 7 Joplin grit mixed with an alkali metal carboxymethyl cellulose. It is preferable to employ from about 5 to about 25 percent of the alkali metal carboxymethyl cellulose with the remainder being the sand or other grit. This charged material occupies a major portion of the volume of these tanks with only a small volume remaining unfilled above the bed of material. If desired, however, a layer of the screen can be placed on top of the charge materials 27 and 28 in order to make certain that materials intended to be retained in the charge beds 27 and 28 are retained therein.

The conduit 15 leads the oil to be dehydrated from a source, not shown, to conduit 16 which feeds tank 13 and to conduit 17 which feeds tank 14. Conduits 16 and 17 discharge the feed oil into perforate sparge tubes 29 and 30, respectively, at positions a short distance below the bars 38. Since liquid water will accumulate in the bottom of these tanks, liquid level flow controller assemblies 31 and 32 are provided for regulating the withdrawal of the accumulated water through conduits 22 and 23. A common water disposal line 24 is provided for disposal of water from either of the tanks.

Conduits 18 and 19 are provided at the top of vessels 13 and 14 for removal of oils of reduced water content. These conduits feed into a common conduit 20 which leads to a capacitance cell 25. From this capacitance cell the treated oil flows through a conduit 21 for such disposal as desired. This capacitance cell will be described hereinafter.

A spring loaded, normally open solenoid valve is provided in each of conduits 17 and 19, the valve in conduit 17 being identified by reference numeral 4 and the valve in conduit 19 being identified by reference numeral 3. For controlling a portion of the operation of each of these solenoid valves there is provided a separate latching relay assembly. This assembly for the regulation of valve 4 includes a solenoid 8, a latch 9 pivoted at 10. This latch is in part actuated by a supported tension spring 11. The latch 9 operates in conjunction with a beveled lug 12.

Valve 3 in conduit 19 is regulated in part by a latching relay system comprising a solenoid 7, a latch 9 pivoted at 10 with the latch being held in operative or inoperative position by a supported tension spring 11. This latch also operates in conjunction with a beveled lug 12.

The motor valves 1 and 2 are spring loaded, normally closed valves. The term normally closed valve means that the spring biases the valve closed while the term normally open valve means that the spring biases the valve open. Motor valves 1 and 2 are actuated in part by solenoids 5 and 6, respectively, and by latching relay apparatus similar to that described relative to motor valves 3 and 4.

The capacitance cell 25, mentioned hereinabove, is fully described as to construction and operation in U.S. Patent 3,005,554, issued October 24, 1961. Such capacitance cells are merely relatively large condensers in which the dielectric is the oil containing moisture. The current carried across the electrodes of the capacitance cell depends on the moisture content of the oil flowing through the cell. Thus, such a cell is calibrated in terms of any desired unit, for example, percent of water in the oil. The signal emitted by the capacitance cell 25 is amplified in amplifier 26 with the amplified signal therefrom passing to a stepping switch 37. Stepping switches suitable for use according to this invention are manufactured by Automatic Electric Company, North Lake, Illinois. In this particular case a four-point stepping switch 37 is employed. Two of the points are actual electrical contact points while the remaining two points are merely neutral or dead points electrically. These stepping switches operate in such a manner that upon receipt of a signal a switch or pointer arm 40 moves from one contact to the next contact as in a clockwise direction. As illustrated in FIGURE 1, the contact 40 is making contact between an electrical terminal 41 with the neutral or blank position $N_2$. Since contact $N_2$ is not connected to any point electrically, when pointer 40 is contacting point $N_2$ there is no completed circuit. Similar conditions exist with respect to blank position or contact $N_1$. Two like contact points C-1 and C-2 are provided between the blank positions $N_1$ and $N_2$.

Wires connecting contact points C-1 and C-2 on the stepping switch are not shown connected directly to lead wires on the several solenoids for purposes of simplicity and clarity of representation of the drawing. However, lead wires C-1b are connected with live cotact C-1 of the stepping switch and lead to contacts C-1b of solenoid valves 3 and 4. In a similar manner, lead wires C-2b connects the live contact C-2 of the stepping switch with contacts C-2b of solenoids 7 and 8 which operate in conjunction with solenoid valves 3 and 4, respectively. In like manner, lead wires C-2a connect point C-2 of the stepping switch with contacts C-2a of solenoids 5 and 6 while lead wires C-1a connect point C-1 of the stepping switch with the solenoids of valves 1 and 2. The central point 41 of the stepping switch is a terminal common to all of the circuits.

In the operation according to this invention, tanks 13 and 14 are charged with a bed of 10 percent by weight of sodium carboxymethyl cellulose and 90 percent by weight of No. 7 Joplin grit. As an example, consider the charge of tank 14 as just become spent at which time oil flowing through conduits 19 and 20 to the capacitance cell 25 contains at least a trace of suspended moisture. The cell 25 emits a signal in response to this high moisture content, with the signal being amplified in amplifier 26. The amplified signal moves stepping switch arm 40 from point $N_2$ to contact point C-1. Upon completion of C-1a through point C-1 previously closed (normally closed) solenoid valves 1 and 2 open and latches 9 hook on the underside of lugs 12, and being biased by springs 11, latch these valves open. Circuits (C-1b) through point C-1 also energize the solenoids of valves 3 and 4 resulting in closing of normally open valves 3 and 4. Upon closing of valves 3 and 4, their corresponding latches 9 latch these latter valves in their closed positions by tension springs.

Thus, upon contacting arm 40 with contact point C-1, tank 14 is taken off-stream and tank 13 is placed onstream.

When the operational changes just mentioned occur as a result of completion of a circuit through contact C-1, treated oil from a fresh filter bed 27 in tank 13 is free from all suspended moisture. Upon passage of this oil, free from suspended moisture and of at least somewhat reduced dissolved moisture content, through cell 25 a signal of markedly reduced intensity is emitted therefrom. This signal is proportionately amplified in amplifier 26 and the amplified signal moves stepping switch contact arm 40 from contact point C-1 to point $N_1$, thereby opening the circuits to the solenoids of valves 1, 2, 3 and 4. These valves remain in the latter stated positions (normally closed valves 1 and 2 are open and normally open valves 3 and 4 are closed).

On reference to FIGURE 2, when cell 25 senses a high water content in oil passing through it, this condition is represented by point A. Upon changing oil flow from a spent filter bed in tank 14 to a fresh filter bed in tank 13, the moisture content of the oil from the fresh bed is represented by point A'. The low moisture content of the treated oil remains at low A' level until the charge in tank 13 becomes spent, at which time the water vs. time curve reaches point B.

When treated oil containing suspended moisture from tank 13 passing through conduits 18 and 20 causes cell 25 to emit a signal proportional to a high water content (point B on the trace of FIGURE 2) and after amplification the amplified signal causes stepping switch arm 40 to move from point $N_1$ to contact C-2. Upon contact of arm 40 with contact point C-2, circuits C-2a energize solenoids 5 and 6 thereby unlatching the normally closed valves 1 and 2 allowing them to close. At the same time, circuits C-2b energize solenoids 7 and 8 thereby unlatching the normally open valves 3 and 4 allowing them to open.

Thus, upon contacting arm 40 with contact point C-2, tank 13 is taken off-stream and tank 14 is placed onstream.

As moisture containing oil passes upward into filter beds 27, 28, the fog or moisture droplets are coagulated or coalesced and become sufficiently large that they settle by gravity to the bottom of the tanks 13, 14. Liquid level control assemblies 31, 32 are provided to regulate withdrawal of the settled water via conduits 22, 23 with 24 in response to a predetermined water level in the tanks. Such control assemblies are in everyday use and their installation and operation are well understood by those skilled in the art.

I have found that very large volumes of oil can be flowed through such a filter bed as herein disclosed and effectively dehydrated to such an extent that the filtered oil is bright and free from all suspended moisture fog. Some dissolved water is also removed from the oil.

While I have described all filtered and moisture reduced oil as flowing through the capacitance cell 25, not all oil need pass therethrough because a small fraction, such as from 1 to 5 percent, or any other desired fraction, can be passed through conduit 20 and cell 25 with the remainder of the oil passing through conduit 43. Valves 42 and 44 are so regulated as to proportion the filtered oil, as desired.

As a specific example of the operation of this invention, a cycle oil containing 438 parts water per million parts of oil, and which appeared quite cloudy, was run in one instance through a body of washed sand alone and in another instance through a body containing 90 percent by weight of washed sand and 10 percent by weight of sodium carboxymethyl cellulose. From run data hereinbelow, it will be noted that on passing 1.53 volumes of oil per volume of sand through the sand alone the oil at the outlet end of the sand became cloudy with moisture; and that oil passed through the sand and sodium carboxymethyl cellulose was still bright and clear and accordingly free from suspended moisture after 61.3 volumes of oil per volume of desiccant were passed through the desiccant. In this latter case, this 61.3 volumes of oil comprised 38,750 cubic centimeters of oil and from this oil 6 cubic centimeters of liquid water were drawn off. After passage of the 61.3 volumes of oil per volume of desiccant, the oil still exited from the desiccant in a clear condition completely and entirely free from suspended water. It is believed that continued large volumes of oil could pass through the desiccant without appearing as clouds in the treated oil.

*Example*

[Contact Mass: Height=30.48 cm.; Diameter=5.08 cm.; Volume=617.8 cc.]

| Materials and Conditions | Prior Art | The Invention |
|---|---|---|
| Charge Oil | Light Cycle | Light Cycle |
| Water Content, p.p.m | 438 | 438 |
| Condition of Oil | Cloudy | Cloudy |
| Vol. Oil/Vol. Contact Mass/Hr | 2.0 | 2.0 |
| Temperature of Run, °F | 77 | 77 |
| Pressure of Run | Atmospheric | Atmospheric |
| Contact Mass: | | |
| Wt. percent Washed Sand | 100 | 90 |
| Sand Size, In | 1/16 to 1/8 | 1/16 to 1/8 |
| Wt. percent sodium carboxymethylcellulose | 0 | 10 |
| Volume, cc | 617.8 | 617.8 |
| Filtered Product: | | |
| Volume Until Cloudy, cc | 946 | [1] 37,850 |
| P.p.m. H₂O until Cloudy | 172 | [1] 154 |
| Vol. Oil/Vol. Contact Mass Before Clouding | 1.53 | [1] 61.3 |
| Water Drop Out from Contact Mass on Shut Down, cc | Not run | About 6 |

[1] Not cloudy, test discontinued at this quantity. Run through using invention's contact mass.

While sodium carboxymethylcellulose was used as the particular desiccant in the above example, it is herein disclosed that any of the alkali metal carboxymethyl celluloses can be used. The other alkali metal carboxymethyl celluloses include potassium carboxymethyl cellulose, lithium carboxymethyl cellulose, cesium carboxymethyl cellulose, and rubidium carboxymethyl cellulose, in addition to the sodium carboxymethyl cellulose, and mixtures of any two or more of these materials.

Crushed oyster shell of about the same particle size as the alkali metal carboxymethyl cellulose may be used in lieu of sand.

After the sand-alkali metal carboxymethyl cellulose material becomes spent as regards water separation, this material can be revivified merely by removing, for example, manhole covers 33 and 35 and removing the material from the vessel and then replacing the covers and after removal of manhole covers 34 and 36 adding either new charge material or heating the used carboxymethyl cellulose to remove the moisture therefrom. After such heating then the same alkali metal carboxymethyl cellulose can be reused.

While I have disclosed use of two vessels alternately, it will be realized that more than two vessels can be used. When three vessels are used, one is usually on stream while the other two are being readied for reuse. Also, a single vessel can be used in which case the desiccation operation is closed down after the desiccant becomes spent while being prepared for reuse.

The solenoid valves, and the latching and unlatching equipment are available from many instrument supply houses and their installation and operation are well understood by those skilled in the art.

While certain embodiments of the invention have been described for illustrative purposes, the invention obviously is not limited thereto.

That which is claimed is:

1. A method for reducing the moisture content of a liquid hydrocarbon containing suspended droplets of moisture comprising introducing said liquid hydrocarbon containing suspended droplets of water into the lower portion of a zone having a lower inlet portion, an upper outlet portion and an intermediate portion provided with a mixture of about 5 to about 25 parts by weight of alkali metal carboxymethyl cellulose with sand being the remainder, passing the introduced liquid hydrocarbon from said inlet portion of said zone upwardly through said mixture into said outlet portion of said zone, said droplets of moisture coalescing in said mixture and dripping into said inlet portion of said zone and settling therein as a layer of water, and withdrawing the hydrocarbon from said outlet portion as hydrocarbon free from suspended droplets of moisture.

2. The method of claim 1 wherein said alkali metal carboxymethyl cellulose is potassium carboxymethyl cellulose.

3. The process of claim 1 wherein said alkali metal is sodium.

4. A method for reducing the moisture content of a liquid hydrocarbon containing suspended droplets of moisture comprising coalescing said droplets by passing said hydrocarbon upwardly through a porous bed containing a mixture of about 5 to about 25 parts by weight of alkali metal carboxymethyl cellulose with solid granular material selected from the group consisting of sand and oyster shell in the range of 95 to 75 parts by weight of said bed, and withdrawing said liquid hydrocarbon of reduced moisture content from the top of said bed and water from the bottom thereof.

5. The method of claim 4 wherein said alkali metal carboxymethyl cellulose is potassium carboxymethyl cellulose and said granular material is sand.

6. The process of claim 4 wherein said granular material is sand and said alkali metal is sodium.

7. The process of claim 4 wherein said granular material is oyster shell.

References Cited by the Examiner

UNITED STATES PATENTS

| | | | |
|---|---|---|---|
| 1,760,539 | 5/30 | Boyer | 208—188 |
| 2,165,703 | 7/39 | Holmes | 208—187 |
| 2,228,353 | 1/41 | Howes | 208—187 |
| 2,749,281 | 6/56 | Ferro | 202—160 |
| 2,977,289 | 3/61 | Kron | 202—160 |
| 3,055,369 | 9/62 | Graham | 260—231 X |
| 3,088,592 | 5/63 | Clark. | |

ALPHONSO D. SULLIVAN, *Primary Examiner.*

DANIEL E. WYMAN, *Examiner.*